United States Patent [19]

Bawin et al.

[11] Patent Number: 5,495,133
[45] Date of Patent: Feb. 27, 1996

[54] ELECTRIC MOTOR WITH HIGH POWER AND HIGH ROTATIONAL SPEED

[75] Inventors: Pierre Bawin, Mont/Sur/Marchiene; Roland Botte, Courcelle; Jean-Marie Edebouw, Marbaix-La-Tour; Dominique Gilon, Waterloo, all of Belgium

[73] Assignee: Gec Alsthon Acec Energie, Marchienne-au-Pont, Belgium

[21] Appl. No.: 189,329

[22] Filed: Jan. 31, 1994

[51] Int. Cl.$^6$ ............................................. H02K 17/16
[52] U.S. Cl. .......................... 310/211; 310/45; 310/51; 310/262; 74/573 R
[58] Field of Search ........................ 310/211, 125, 310/212, 261, 262, 51, 45; 74/573 R

[56] References Cited

U.S. PATENT DOCUMENTS

| | | | |
|---|---|---|---|
| 3,134,040 | 5/1964 | Barth | 310/211 |
| 3,517,238 | 6/1970 | Lake | 310/211 |
| 4,064,410 | 12/1977 | Roach | 310/211 |
| 4,362,959 | 12/1982 | Bartheld et al. | 310/211 |
| 4,490,638 | 12/1984 | Lind | 310/211 |
| 5,068,560 | 11/1991 | Lundquist | 310/211 |

FOREIGN PATENT DOCUMENTS

| | | |
|---|---|---|
| 0343313 | 11/1989 | European Pat. Off. . |
| 1933691 | 3/1966 | Germany . |
| 89129 | 5/1921 | Switzerland . |
| 93/00735 | 1/1993 | WIPO . |

OTHER PUBLICATIONS

Vol. 7, No. 27 (E–156); Feb. 3, 1983; 183,241; Nov. 11, 1982 Japan (Abstract).
Vol. 2, No. 133, Sep. 1, 1978; #100, 412; Japan (Abstract).

Primary Examiner—R. Skudy
Attorney, Agent, or Firm—Chilton, Alix & Van Kirk

[57] ABSTRACT

A squirrel cage type rotor for a high speed electric motor comprises longitudinally extending bars which are in electrical contact with, but not affixed to, conductive end rings of the rotor. The bars are electrically conductive and are each affixed to the armature core at a single point located intermediate the end rings.

15 Claims, 1 Drawing Sheet

ELECTRIC MOTOR WITH HIGH POWER AND HIGH ROTATIONAL SPEED

SUBJECT OF THE INVENTION

The present invention relates to high power electric motors which are intended to operate at very high rotational speeds. More particularly this invention is directed to improvements in rotors for such motors, particularly asynchronous motors.

TECHNICAL FIELD OF THE INVENTION

There is currently a need for powerful electric motors which can operate at a high rotational speed, namely of the order of 10,000 rpm and more.

Recent improvements in semiconductors with the capability of controlling large electric currents make it possible to control variable-frequency high power asynchronous motors and therefore to regulate the rotational speed of the asynchronous motors which can be employed with loads which are on the order of several megawatts.

The starting of high power motors of the abovementioned type poses certain problems, particularly with respect to the mechanical strength of the moving parts of the rotor.

In a rotor of conventional construction, the stiffness of the shaft does not impart sufficient rigidity to the rotor assembly to allow it to reach very high rotational speeds without encountering a critical bending speed.

Patent Application EP-A-0,343,313 describes a particularly favorable embodiment of an electric motor capable of developing high power and high rotational speed in which the rotor comprises a shaft on which a magnetic mass, preferably consisting of armature core disk laminations, is mounted by clamping. The armature core is held by two plates which are secured to the shaft and joined together by bars. The plates, which are usually referred to as end rings, and bars form a "squirrel cage" and are fabricated from a material with high mechanical strength and low electrical resistivity.

In the above-described prior art motor, the plates act as end rings for short circuiting the squirrel cage.

In the motor of application EP-A-0343,313 the bars joining the end rings are also made secure to the latter by clamping. More particularly, the bars are housed in suitable orifices which are provided in the periphery of the end rings and the ends of these bars are then expanded by the insertion of tapered spindles.

It is also possible to rigidly fix the bars of the squirrel cage to the short circuiting ring by brazing for example, as is done in most conventional machines.

Nevertheless, in either case, the bar-rings assembly constitutes a particularly hyperstatic assembly which is subjected to differential expansions which generate thermal imbalances.

The influence of these imbalances becomes particularly significant in the case of machines with high or very high speed.

Document DE-U-1,933,691 describes an electric motor having rotor bars which do not bear on the walls of the slot over the entire length of the motor. Furthermore, the assembly of the bars to the short circuiting rings is done through the use of a flexible connection.

Document JP-A-57 183241 describes a motor having a construction which makes it possible to prevent the bars from moving with respect to floating short circuiting rings.

Document WO-A-93/00735 and document CH-A-89189 both describe fixed connections between the bars and the short circuiting rings of an electric motor.

Document JP-A-53,100,412 describes the use of longitudinal bars which are slit over their entire length for the purpose of preventing any movement of these bars in the slot of the short circuiting rings of an electric motor with the purpose of promoting a good contact for cooling.

SUMMARY OF THE INVENTION

The present invention overcomes the above-described and other disadvantages of the prior art and, in so doing, provides an electric motor with high power and high rotational speed which does not exhibit the drawbacks of the prior art.

In particular, the present invention is an improvement to the electric motor described in application EP-A-0,343,313, wherein the effects of thermal imbalances are attenuated while the bars constituting the squirrel cage, are capable of freely expanding longitudinally independently of one another.

The present invention thus is an electric motor with high power and high rotational speed capability consisting of a stator and a rotor. The rotor comprises a shaft on which is mounted, by clamping with the aid of two plate-like end rings secured to the rotor shaft, a magnetic mass. This magnetic mass preferably consists of a stack of armature core disk laminations and a squirrel cage consisting of a plurality of longitudinal bars joined together by the short circuiting end rings.

In accordance with the present invention, the bars of the squirrel cage are fixed to the rotor at a single point, preferably at its middle. Fixing may be via any means known per se, for example with the aid of a screw, a pin or by welding, etc . . .

Also in accordance with the present invention, the ends of the bars are received in apertures or bores provided in the short circuiting rings. These apertures have a diameter which is slightly greater than the external diameter of the end of the bar of the squirrel cage which will be housed therein. Accordingly, there will be a slight clearance between the bar and the wall of the cooperating aperture when the rotor is at rest.

The above-described clearance allows the bars to expand freely in the cooperating apertures of the rings, but is sufficiently small to ensure electrical contact to allow the current to pass. Indeed, in order to ensure the rotation of the motor, it is appropriate to have an excellent electrical contact between the bars and the rings, this being particularly true when the current is high.

Motors of the type being described typically have a variable frequency controller which provides low starting current. In the present invention, the slight pressure of the bars in the receiving apertures of the end rings is sufficient to permit the flow of the starting current.

When the motor increases its speed, with centrifugal force becoming stronger, the bars are deformed and are thus caused to bear against the walls of the cooperating apertures in the short circuiting rings with increased force, thus providing a better electrical contact.

According to a preferred embodiment of the present invention, the ends of the longitudinal squirrel cage bars are hollowed out and slit over a distance which corresponds to the axial thickness of the short circuiting ring to form "lips". Under the action of the centrifugal force, the lips at the end of the bar advantageously move apart and thereby exert a greater and greater pressure on the internal face of the corresponding aperture in the short circuiting ring, thus providing an excellent contact between the bar and the ring.

Furthermore, the ends of the longitudinal squirrel cage bars are preferably provided with a coating which reduces the friction between the ends of the bars and the walls of the cooperating apertures.

According to another preferred embodiment of the present invention, the internal face of the blind holes, i.e., the hollowed out portions, of the ends of the bars are screw-threaded so as to permit the mounting of balancing weights therein.

BRIEF DESCRIPTION OF THE DRAWING

The present invention will be described in more detail with reference to the appended figures which diagrammatically represent a preferred embodiment.

The same numerical references are used in the different figures to represent identical or similar elements.

DETAILED DESCRIPTION OF A PREFERRED EMBODIMENT OF THE PRESENT INVENTION

Figure 1:
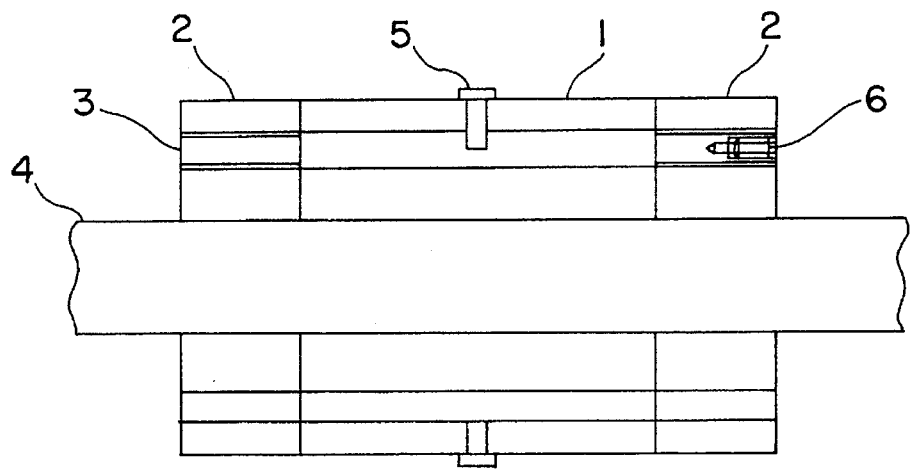
FIG. 1 represents a view in longitudinal section of the rotor of an electric motor with high power and high rotational speed according to the present invention.

FIG. 1 represents solely the rotor of a motor according to the present invention, i.e., the cooperating stator does not include novel features of the invention and thus has not been shown. As will be recognized by those skilled in the art, the stator will be coaxial with the rotor and radially spaced therefrom by an air gap.

The rotor includes a shaft 4 supported at its opposite ends in suitable bearings, not shown. A magnetic mass 1 consisting of armature core disk laminations is mounted on shaft 4, the armature core disk laminations being held on the shaft by clamping.

The armature core disk laminations are clamped against one another by a pair of oppositely disposed end rings 2. End rings 2 are press fit onto shaft 4.

Rings 2 are joined together by bars 3 in order to form the squirrel cage of the rotor. Consequently, rings 2 act as short circuiting rings while providing a rigid mechanical connection between the shaft 4 and the bars 3 of the squirrel cage so as to increase the stiffness of the rotor assembly.

Advantageously, the bars 3 and the rings 2 consist of copper alloy which has a high mechanical strength and low electrical resistivity.

According to the present invention, the bars are fixed at a single point, preferably at their middle, to the magnetic mass 1, i.e., the armature core, with the aid of a fastening means 5. The fastening means may be any means known per se, for example a screw, a pin, or the fastening may be by welding.

According to the present invention, the ends of the bars 3 are slidably received in apertures provided. Advantageously, at least the end portions of bars 3 have a circular cross-section and the apertures which receive these bar end portions have an inner diameter which is slightly greater than the outer diameter of the end portions of the bars 3 which will be housed therein. In this way, a small tolerance clearance remains which allows the bars to expand freely in the apertures in the end rings 2, but this clearance must nevertheless be sufficiently small so as to ensure sufficient contact so that current may flow between the bars and rings even when the rotor is at rest.

Advantageously, the ends of the bars 3 have a coating, obtained by galvanostegy, which gives them a sliding contact in the orifice of the short circuiting ring 2.

Figure 2:
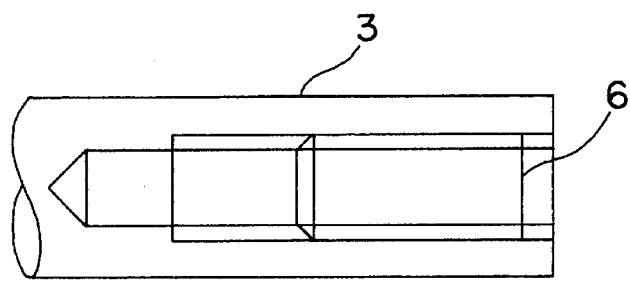
FIG. 2 represents a view in longitudinal section of a squirrel cage bar of the rotor of FIG. 1.
Figure 3A:
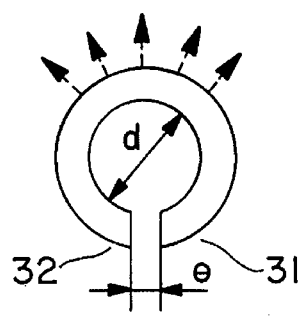
FIGS. 3 and 3b represent cross-sectional views, taken transverse to FIG. 2 of two embodiments of longitudinal squirrel cage bars for the use in the present invention.
Figure 3B:
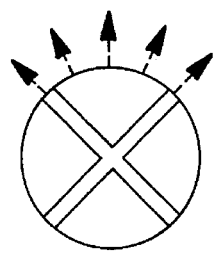

According to a preferred embodiment represented in FIGS. 2 and 3a, the ends of the bars 3 are hollowed out, i.e., are provided with blind holes and slit over a distance which corresponds essentially to the axial thickness of the short circuiting ring 2. The fact that the ends of the bars 3 are provided with one or more slits, represented in FIGS. 3a and 3b, allows the lip portions 31 and 32 of the bar 3 defined by the slits to move apart under the action of centrifugal force and thereby exert a pressure, which increases with the rotational speed, on the internal face of the cooperating aperture thus providing an enhanced electrical contact while allowing sliding under the action of the expansion.

According to this preferred embodiment described previously, the free expansion of the bars making up the squirrel cage may take place independently of one another and thereby allows the distortional effects due to thermal imbalances to be decreased.

Furthermore, as may be seen from FIG. 2, the hollowed-out ends of the bars 3 are advantageously screw-threaded so that balancing weights 6 can be inserted therein.

I claim:

1. An improved rotor for use in an electric motor capable of operating at high rotational speeds, the rotor being sized and shaped for cooperation with a stator and being supported for rotation about an axis relative to the stator, said rotor comprising:

a shaft, said shaft defining the axis of rotation of the rotor;

an armature core mounted on said shaft for rotation therewith, said core including a pair of oppositely disposed end rings, said end rings being comprised of electrically conductive material, each of said end rings being provided with an array of apertures therein; and a plurality of electrically conductive bars extending through said armature core between said end rings, said bars and core cooperating to define a squirrel cage-type rotor, said bars each having an axis and oppositely disposed end portions, said bar end portions each being received in a said aperture in a said end ring, said end portions of said bars being sized and shaped to permit movement thereof relative to said end rings while maintaining electrical contact between said bars and the walls of said apertures in said end rings, said bars being arranged with their axes generally parallel to the axis of said shaft, said bars being affixed to said core at points located intermediate said end rings.

2. The apparatus of claim 1 wherein said bars are fixed to said armature core at points which are substantially equidistant from said end rings.

3. The apparatus of claim 1 wherein at least some of said bars further comprise:

a blind hole formed in said oppositely disposed end portions, said blind holes being coaxial with the bar, at least a first slot being provided through the portion of the bar which defines a wall of each said hole whereby said end portions of the bar are at least in part capable of radial expansion.

4. The apparatus of claim 2 wherein at least some of said bars further comprise:

a blind hole formed in said oppositely disposed end portions, said blind holes being coaxial with the bar, at least a first slot being provided through the portion of the bar which defines a wall of each said hole whereby said end portions of the bar are at least in part capable of radial expansion.

5. The apparatus of claim 1 wherein said bars each further comprise:

a coating provided on the said end portions, said coatings reducing the friction between said bar end portions and the wall of the aperture in said end ring which receives the bar end portion.

6. The apparatus of claim 2 wherein said bars each further comprise:

a coating provided on the said end portions, said coatings reducing the friction between said bar end portions and the wall of the aperture in said end ring which receives the bar end portion.

7. The apparatus of claim 3 wherein said bars each further comprise:

a coating provided on the said end portions, said coatings reducing the friction between said bar end portions and the wall of the aperture in said end ring which receives the bar end portion.

8. The apparatus of claim 4 wherein said bars each further comprise:

a coating provided on the said end portions, said coatings reducing the friction between said bar end portions and the wall of the aperture in said end ring which receives the bar end portion.

9. The apparatus of claim 1 further comprising:

an axial bore provided in at least of some of said bar end portions; and a balancing weight positioned in at least some of said axial bores.

10. The apparatus of claim 9 wherein said axial bores are provided with a threaded wall portion and wherein said balancing weights are provided with a cooperating outer thread.

11. The apparatus of claim 9 wherein said bars are fixed to said armature core at points which are substantially equidistant from said end rings.

12. The apparatus of claim 9 wherein said bars each further comprise:

a coating provided on the said end portion, said coatings reducing the friction between said bar end portions and the wall of the aperture in said end ring which receives the bar end portion.

13. The apparatus of claim 11 wherein said bars each further comprise:

a coating provided on the said end portion, said coatings reducing the friction between said bar end portions and the wall of the aperture in said end ring which receives the bar end portion.

14. The apparatus of claim 9 wherein at least some of said bars further comprise:

a blind hole formed in said oppositely disposed end portions, said blind holes being coaxial with the bar, at least a first slot being provided through the portion of the bar which defines a wall of each said hole whereby said end portions of the bar are at least in part capable of radial expansion.

15. The apparatus of claim 13 wherein at least some of said bars further comprise:

a blind hole formed in said oppositely disposed end portions, said blind holes being coaxial with the bar, at least a first slot being provided through the portion of the bar which defines a wall of each said hole whereby said end portions of the bar are at least in part capable of radial expansion.

* * * * *